United States Patent
Tadano

(10) Patent No.: US 7,260,032 B2
(45) Date of Patent: Aug. 21, 2007

(54) FOCAL POINT ADJUSTING METHOD, AND OPTICAL PICKUP DEVICE

(75) Inventor: Hiroyuki Tadano, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 637 days.

(21) Appl. No.: 10/485,404

(22) PCT Filed: Jun. 11, 2002

(86) PCT No.: PCT/JP02/07769

§ 371 (c)(1),
(2), (4) Date: Jan. 30, 2004

(87) PCT Pub. No.: WO03/015084

PCT Pub. Date: Feb. 20, 2003

(65) Prior Publication Data

US 2004/0196766 A1    Oct. 7, 2004

(30) Foreign Application Priority Data

Aug. 6, 2001 (JP) .............................. 2001-238192
Jun. 11, 2002 (JP) .............................. 2002-170622

(51) Int. Cl.
*G11B 7/00* (2006.01)

(52) U.S. Cl. .............................. 369/44.29; 369/44.32; 369/44.23; 369/53.35

(58) Field of Classification Search ...................... None
See application file for complete search history.

(56) References Cited

U.S. PATENT DOCUMENTS

| | | | |
|---|---|---|---|
| 6,011,762 A * | 1/2000 | Watanabe et al. ........ | 369/44.27 |
| 6,078,554 A | 6/2000 | Ootaki et al. | |
| 6,169,714 B1 | 1/2001 | Tanaka et al. | |
| 6,215,756 B1 * | 4/2001 | Shimano et al. ........ | 369/112.26 |
| 6,324,133 B1 | 11/2001 | Ichimura | |
| 6,498,330 B1 | 12/2002 | Yoshida | |
| 6,885,616 B2 * | 4/2005 | Kikuchi et al. .......... | 369/44.23 |

FOREIGN PATENT DOCUMENTS

| | | |
|---|---|---|
| CN | 1215207 A | 4/1999 |
| CN | 1244006 A | 2/2000 |
| JP | 11353681 A | * 12/1999 |

(Continued)

*Primary Examiner*—Andrea Wellington
*Assistant Examiner*—Peter Vincent Agustin
(74) *Attorney, Agent, or Firm*—David G. Conlin; William J. Daley, Jr.; Edwards Angell Palmer & Dodge LLP

(57) ABSTRACT

A focus control process (S2), a spherical aberration correcting process (S4), and a focus offset adjusting process (S7 to S9) are performed in this order. In the focus control process, an output of a focus error signal obtained by detecting focal point displacement that occurs in a direction of an optical axis of a light beam focused through a two-element object lens is controlled so that the output becomes close to zero. In the spherical aberration correcting process, spherical aberration that occurs with respect to the light beam is corrected. In the focus offset adjusting process, offset of the focus error signal is adjusted. In this way, it is possible to provide a focal point adjusting method and an optical pickup device in which focus control can be performed stably by eliminating the offset.

17 Claims, 9 Drawing Sheets

FOREIGN PATENT DOCUMENTS

| | | |
|---|---|---|
| JP | 2000-11388 | 1/2000 |
| JP | 2000-40237 | 2/2000 |
| JP | 2000-339726 | 12/2000 |
| JP | 2001-507463 | 6/2001 |
| WO | WO99/18466 | 4/1999 |

\* cited by examiner

FOCAL POINT ADJUSTING METHOD, AND OPTICAL PICKUP DEVICE

TECHNICAL FIELD

The present invention relates to a focal point adjusting method for detecting focal point displacement caused by a focusing optical system and adjusting a focal point, and relates to an optical pickup device employing the focal point adjusting method.

BACKGROUND ART

It is a recent demand to increase storage density of an optical disk, so as to respond to an increasing amount of information. Under this circumstance, linear storage density of an information storing layer in an optical disk has been increased, and a pitch of tracks has been narrowed, so as to increase the storage density of an optical disk. In order to respond to the increased storage density of an optical disk, it is necessary to reduce a beam diameter of a light beam focused on an information storing layer of the optical disk.

Possible methods for reducing the beam diameter of the light beam are as follows: (1) increasing a numerical aperture (NA) of the light beam radiated from an object lens, which is a focusing optical system of an optical pickup device that performs recording and reproduction by using the optical disk, and/or (2) shortening a wavelength of the light beam.

It is conceivable that the wavelength of the light beam can be decreased by changing a light source, that is, by replacing a red semiconductor laser with a bluish-purple semiconductor laser, which is beginning to be produced commercially on a large scale.

On the other hand, as a method for realizing an object lens having a high numerical aperture, proposed is a method in which the object lens is combined with a hemispherical lens. In this method, an object lens includes the two lenses (two lenses in group).

Generally, an optical disk is arranged so that an information storing layer thereof is covered with a cover glass. This is to protect the information storing layer from dust and scratch. Therefore, a light beam transmitted through an object lens of an optical pickup device is transmitted through the cover glass, and focused on the information storing layer under the cover glass. In this way, a focal point is made.

When the light beam is thus transmitted through the cover glass, spherical aberration (SA) is caused. The spherical aberration SA is given by $$SA \propto d \cdot NA^4 \quad (1).$$

The spherical aberration SA is proportional to a thickness d of the cover glass and to a fourth power of the numerical aperture NA of the object lens. Usually, the spherical aberration of the light beam transmitted through the object lens and the cover glass is sufficiently small. This is because the object lens is usually designed so that the spherical aberration is canceled out.

However, if the thickness of the cover glass is scooched from a predetermined value, spherical aberration is caused with respect to the light beam focused on the information storing layer. This increases the beam diameter. As a result, there is a problem that information cannot be read and written correctly.

According to Formula (1), an error $\Delta SA$ of the spherical aberration caused by an error $\Delta d$ of the thickness of the cover glass is proportional to the error $\Delta d$ of the thickness of the cover glass. That is, the greater the $\Delta d$ of the thickness of the cover glass is, the greater is the error $\Delta SA$ of the spherical aberration. Because of this, information cannot be read and written correctly.

In case of a conventional optical disk such as a DVD (Digital Versatile Disc), a numerical aperture NA of an object lens of an optical pickup device used is small: about 0.6. Therefore, the error $\Delta SA$ of the spherical aberration caused by the error $\Delta d$ of the thickness of the cover glass is small. As a result, it is possible to focus the light beam as a sufficiently small spot on each information storing layer.

Meanwhile, a DVD including two information storing layers is already produced commercially. Such a DVD is an example of a multi-layered optical disk in which information storing layers are laminated so as to increase information storage density in a thickness direction of the optical disk. In an optical pickup device that performs recording and reproduction by using such a multi-layered optical disk, it is necessary to focus the light beam as a sufficiently small spot on each information storing surface of the optical disk.

However, in such a multi-layered optical disk, a thickness from a surface of the optical disk (surface of the cover glass) to the information storing layer is different from layer to layer. Therefore, spherical aberration caused when the light beam is transmitted through the cover glass of the optical disk is different from layer to layer. Here, for example, a difference (error $\Delta SA$) between spherical aberration occurring in adjacent information storing layers is proportional to an interlayer distance t (equivalent to the thickness d) between the adjacent information storing layers, according to Formula (1).

Even if the error $\Delta d$ of the thickness of the cover glass is the same, a higher numerical aperture NA results in greater spherical aberration SA. For example, if NA=0.85, the spherical aberration SA is approximately four times greater than that of a case in which NA=0.6. Therefore, from Formula (1), it is found that the higher the numerical aperture is, such as when NA=0.85, the greater is the spherical aberration caused by the error $\Delta d$ of the thickness of the cover glass.

Likewise, in case of the multi-layered optical disk, even if the interlayer distance between adjacent information storing layers is the same, a higher NA of the object lens of the optical pickup device results in a greater difference (error $\Delta SA$) in spherical aberration. For example, if NA=0.85, an error in the spherical aberration SA is approximately four times greater than that of a case in which NA=0.6. Therefore, from Formula (1), it is found that the higher the numerical aperture is, such as when NA=0.85, the greater is the difference in spherical aberration between information storing layers.

Therefore, an object lens having a high numerical aperture is problematic in that (1) an error in spherical aberration has an unignorable influence, and (2) information is read with lower accuracy. In view of the circumstance, it is necessary to correct the spherical aberration in order to attain high storage density by using an object lens having a high numerical aperture.

As a means of correcting the spherical aberration, an optical pickup device that detects and corrects the spherical aberration is disclosed in Japanese Publication For Unexamined Patent Application, Tokukai 2000-171346 (publication date: Jun. 23, 2000), for example. The optical pickup device makes use of a phenomenon that, when light is focused on an information storing layer of an optical disk, a light beam in a vicinity of an optical axis of the light and a light beam exterior to the vicinity of the optical axis are focused on different focus positions, due to the spherical aberration.

According to the optical pickup device disclosed in the publication, the light beam to be detected is split, into a light beam in the vicinity of the optical axis and a light beam exterior to the vicinity of the optical axis, by an optical element such as a hologram. Then, when spherical aberration is caused, with respect to one of the light beams, a gap between the focus position and the information storing layer is detected. Based on a result of the detection, the spherical aberration is corrected. In this way, it is possible to sufficiently reduce diameters of the light beams respectively focused on the information storing layers of the optical disk.

In accordance with an amount of the spherical aberration that is thus detected, it is possible to correct the spherical aberration of a focusing optical system of the optical pickup device by using a spherical aberration correcting mechanism. In this way, it is possible to keep the spherical aberration always small. Moreover, by performing, while optical information is recorded or reproduced, a spherical aberration correcting servo in which spherical aberration is detected and corrected so that an amount of the spherical aberration is always kept small, it is possible to keep the beams always in a best condition while information is recorded in or reproduced from a magnetooptical storing medium.

However, the optical pickup device disclosed in the publication includes not only (1) a focusing servo, which ensures that a focus is always on the information storing layer, and (2) a tracking servo, which focuses a light beam on a central position of a track of an optical information storing medium, but also (3) a spherical aberration correcting servo.

Therefore, if a servo introduction order and offset adjustment for a servo signal are inadequate, offset is left in the servo signal.

DISCLOSURE OF INVENTION

The present invention was made in light of the foregoing problems. An object of the present invention is to provide a focal point adjusting method and an optical pickup device that perform stable focus control by eliminating offset.

To solve the foregoing problems, a focal point adjusting method of the present invention for adjusting a focal point of a focused light beam includes:

a focus controlling process in which an output of a focus error signal is controlled so that the output becomes close to zero, the focus error signal being obtained by detecting focal point displacement that occurs in a direction of an optical axis of the light beam focused by passing through a focusing optical system;

a spherical aberration correcting process in which spherical aberration that occurs with respect to the light beam is corrected; and a focus offset adjusting process in which offset of the focus error signal is adjusted.

In this method, the offset of the focusing error signal is adjusted after (i) the output of the focus error signal is reduced to zero by the focus controlling process, and (ii) a slope of a linear portion of the focus error signal is steepened so that the spherical aberration that occurs in the focusing optical system becomes so small as to be ignorable.

Therefore, if the offset of the focus error signal is adjusted after the spherical aberration is corrected with respect to the focus error signal whose output is zero, the offset is adjusted to be zero after the slope of the linear portion of the focus error signal is steepened.

Thus, offset can be eliminated from the focus error signal by adjusting the offset of the focus error signal after correcting the spherical aberration and, for example, turning ON a loop of a spherical aberration correcting servo, so that the spherical aberration, which is generated in the focusing optical system, is reduced to a smallest possible amount.

As a result, it is possible to provide a focal point adjustment method with which the spherical aberration is corrected stably, and the focal point displacement that occurs in the direction of the optical axis is controlled stably, so that the focal point of the light beam radiated will not be displaced, for example.

Moreover, it is preferable that, in the focal point adjusting method, the spherical aberration is detected from a focus error signal obtained from at least one of (a) an inner circumferential region of the light beam and (b) an outer circumferential region of the light beam, which are split from each other by light beam splitting means.

With this arrangement, it is possible to detect the spherical aberration by detecting a difference of (1) a focal point of the inner circumferential region of the light beam or (2) a focal point of the outer circumferential region of the light beam. Therefore, it is possible to detect the spherical aberration sensitively.

Alternatively, it is preferable that, in the focal point adjusting method of the present invention, a spherical aberration error signal SAES, which is indicative of the spherical aberration, satisfies any one of the following:

$$SAES = F1 - (F1+F2) \times K1;$$

$$SAES = F2 - (F1+F2) \times K2; \text{ and}$$

$$SAES = F1 - F2 \times K3,$$

where F1 is a first focus error signal obtained by detecting the focal point displacement, which occurs in the direction of the optical axis, of the outer circumferential region of the light beam, F2 is a second focus error signal obtained by detecting the focal point displacement, which occurs in the direction of the optical axis, of the inner circumferential region of the light beam, and K1, K2, and K3 are coefficients.

With method, it is possible to remove, from the spherical aberration error signal SAES, crosstalk from the focus error signal. Therefore, it is possible to detect the spherical aberration accurately from the spherical aberration error signal SAES.

It is preferable that, in the focal error adjusting method of the present invention, the spherical aberration of the focusing optical system is corrected by moving at least one lens of a lens group including one or more lens of the focusing optical system.

With this method, it is possible to correct the spherical aberration accurately with a simple arrangement.

It is preferable that, in the focal point adjusting method of the present invention, there is a repetition of the spherical aberration correcting process and the focus offset adjusting process; and a focal point adjustment for the light beam is terminated after the focus offset adjustment process is performed at an end of the repetition.

With this method, by repeating the spherical aberration correcting process and the focus offset adjusting process, it is possible to correct the spherical aberration and to adjust the offset of the focus error signal even if offset amount of the focus error signal and a remaining amount of the spherical aberration are initially (i.e. before the focal point adjustment is performed) large.

When the spherical aberration is corrected, a sensitivity of the focus error signal is changed. This change causes offset. However, according to the arrangement above, the focal point adjustment is not terminated in the presence of such offset, because the focus offset adjustment process is performed at the end of the repetition.

Therefore, it is possible to terminate the focal point adjustment after offset has been eliminated. As a result, it is possible, for example, to reproduce information from the optical storing medium without offset.

Moreover, an optical pickup device of the present invention includes:

a light source;

a focusing optical system that focuses a light beam radiated from the light source and reflected on a storing medium;

focusing error detecting means for detecting a focus error signal indicative of focal point displacement that occurs in a direction of an optical axis of the light beam;

focus control means for controlling an output of the focus error signal so that the output becomes close to zero;

focus offset adjusting means for adjusting offset of the focus error signal;

spherical aberration detecting means for detecting spherical aberration of the focusing optical system; and spherical aberration correcting means for correcting the spherical aberration, the focusing offset adjusting means adjusting the offset of the focus error signal after (i) the focus control means controls the output of the focus error signal, and (ii) the spherical aberration correcting means corrects the spherical aberration.

In this arrangement, the offset of the focusing error signal is adjusted after (i) the output of the focus error signal is reduced to zero by the focus control means, and (ii) a slope of a linear portion of the focus error signal is steepened so that the spherical aberration becomes so small as to be ignorable.

Thus, offset can be eliminated from the focus error signal by adjusting the offset of the focus error signal after (a) correcting the spherical aberration and, for example, (b) turning ON a loop of the spherical aberration correcting servo, so that the spherical aberration, which occurs in the focusing optical system, is reduced to a smallest possible amount.

As a result, it is possible to provide an optical pickup device with which the spherical aberration is corrected stably and the focal point displacement that occurs in the direction of the optical axis is controlled stably, so that the focal point of the light beam radiated will not be displaced.

Alternatively, it is preferable that the optical pickup device of the present invention further includes:

light beam splitting means for splitting the light beam transmitted through the focusing optical system, into (a) an inner circumferential region and (b) an outer circumferential region, the spherical aberration detecting means detecting the spherical aberration from a focus error signal obtained from at least one of (a) the inner circumferential region of the light beam and (b) the outer circumferential region of the light beam.

With this arrangement, it is possible to detect the spherical aberration by detecting a difference of (1) the focal point of the inner circumferential region of the light beam or (2) the focal point of the outer circumferential region of the light beam. Therefore, it is possible to detect the spherical aberration sensitively.

In is preferable that, in the optical pickup device of the present invention, the spherical aberration detecting means generates a spherical aberration error signal indicative of the spherical aberration of the focusing optical system; and SAES, which is the spherical aberration error signal, satisfies any one of the following:

$$SAES=F1-(F1+F2)\times K1;$$

$$SAES=F2-(F1+F2)\times K2; \text{ and}$$

$$SAES=F1-F2\times K3,$$

where F1 is a first focus error signal obtained by detecting the focal point displacement, which occurs in the direction of the optical axis, of the outer circumferential region of the light beam, F2 is a second focus error signal obtained by detecting the focal point displacement, which occurs in the direction of the optical axis, of the inner circumferential region of the light beam, and K1, K2, and K3 are coefficients.

With this arrangement, it is possible to remove, from the spherical aberration error signal SAES, crosstalk from the focus error signal. Therefore, it is possible to detect the spherical aberration accurately from the spherical aberration error signal SAES.

It is preferable that, in the optical pickup device of the present invention, the spherical aberration correcting means corrects the spherical aberration by performing such an adjustment as to maximize an amplitude of a reproduction signal obtained by reading information stored in the storing medium.

With this arrangement, it is possible to correct the spherical aberration by monitoring the reproduction signal, and driving the focusing optical system so that the amplitude of the reproduction signal is maximized. Therefore, the spherical aberration can be corrected accurately with a simple arrangement.

It is preferable that, in the optical pickup device of the present invention, the spherical aberration correcting means corrects the spherical aberration by performing such an adjustment as to maximize an amplitude of a tracking error signal indicative of the focal point displacement that occurs in a radial direction of the storing medium.

With this arrangement, it is possible to correct the spherical aberration by monitoring the tracking error signal, and driving the focusing optical system so that the amplitude of the tracking error signal is maximized. Therefore, the spherical aberration can be corrected accurately with a simple arrangement.

Moreover, it is preferable that, in the optical pickup device of the present invention, the focusing optical system is a lens group including one or more lens; and the spherical aberration correcting means moves at least one lens of the lens group.

With this arrangement, it is possible to correct the spherical aberration accurately with a simple arrangement.

It is preferable that, in the optical pickup device of the present invention, the focus offset adjusting means adjusts the offset of the focus error signal by performing such an adjustment as to maximize an amplitude of a reproduction signal obtained by reading information stored in the storing medium.

With this arrangement, the offset of the focus error signal can be adjusted, by monitoring the reproduction signal, and driving the focusing optical system, for example, so that the amplitude of the reproduction signal is maximized. Therefore, the offset can be adjusted with high accuracy.

It is preferable that the optical pickup device of the present invention further includes:

a tracking control means for (a) detecting a tracking error signal indicative of focal point displacement that occurs in a radial direction of the storing medium, and (b) correcting, in accordance with the tracking error signal, the focal point displacement that occurs in the radial direction of the storing medium, the focus offset adjusting means adjusting the offset of the focus error signal whose focal point displacement that occurs in the radial direction of the storing medium has been adjusted by the tracking control means.

With this arrangement, it is possible to prevent the amplitude of the reproduction signal from being changed by an influence of the tracking error signal. Therefore, the offset of the focus error signal can be adjusted with high accuracy.

It is preferable that the optical pickup device of the present invention further includes:

a tracking control means for (a) detecting a tracking error signal indicative of focal point displacement that occurs in a radial direction of the storing medium, and (b) correcting, in accordance with the tracking error signal, the focal point displacement that occurs in the radial direction of the storing medium, the focus offset adjusting means adjusting the offset of the focus error signal by performing such an adjustment as to maximize an amplitude of the tracking error signal.

With this arrangement, even if the reproduction signal cannot be used for the offset adjustment because no modulated component appears in the reproduction signal of an unused storing medium (e.g. if the storing medium has a wobble structure, that is, if the storing medium has undulating track grooves so as to store address information), it is possible to adjust the offset of the focus error signal.

It is preferable that, in the optical pickup device of the present invention, if (a) the storing medium has a plurality of information storing layers, and (b) information is recorded in and reproduced from the storing medium, the focus offset adjusting means adjusts the offset when the focal point of the light beam jumps from one of the information storing layers into another of the information storing layers.

With this arrangement, if the storing medium has a plurality of information storing layers, the offset can be removed from the focus error signal not only when the storing medium is loaded, but also when the focal point of the light beam jumps from one of the information storing layers into another of the information storing layers.

It is preferable that, in the optical pickup device of the present invention, if there is a repetition of (a) offset adjustment for the focus error signal by the focus offset adjusting means and (b) a correction of the spherical aberration, the focus offset adjusting means performs, at an end of the repetition, (a) the offset adjustment for the focus error signal.

With this arrangement, by repeating the offset adjustment and the correction of the spherical aberration, it is possible to correct the spherical aberration and to adjust the offset of the focus error signal even if the offset amount of the focus error signal and the remaining amount of the spherical aberration are initially (i.e. before the focal point adjustment is performed) large.

When the spherical aberration is corrected, the sensitivity of the focus error signal is changed. This change causes offset. However, according to the arrangement above, the focal point adjustment will not be terminated in the presence of such offset, because the focus offset adjustment process is performed at the end of the repetition.

Therefore, it is possible to terminate the focal point adjustment after the offset has been eliminated. As a result, it is possible, for example, to reproduce information from the optical storing medium without offset.

The following description will sufficiently explain other objectives, features, and advantages of the present invention. Benefits of the present invention will be clearly explained below, with reference to the attached drawings.

BRIEF DESCRIPTION OF DRAWINGS

In FIG. 1, a schematic arrangement of an optical recording and reproducing apparatus is illustrated. Here, the optical recording and reproducing apparatus includes an optical pickup device that employs a focal point adjustment method.

BEST MODE FOR CARRYING OUT THE INVENTION

The following embodiments and comparative examples more specifically describe the present invention. It should be noted that the present invention is not limited to the embodiments and comparative examples.

With reference to FIGS. 1 to 9, one embodiment of the present invention is described below. Note that the present embodiment discusses an example in which a focal point adjusting method of the present invention is employed in an optical pickup device provided to an optical recording and reproducing apparatus that records and reproduces information optically by using an optical disk (storing medium), which is an optical storing medium.

Figure 1:
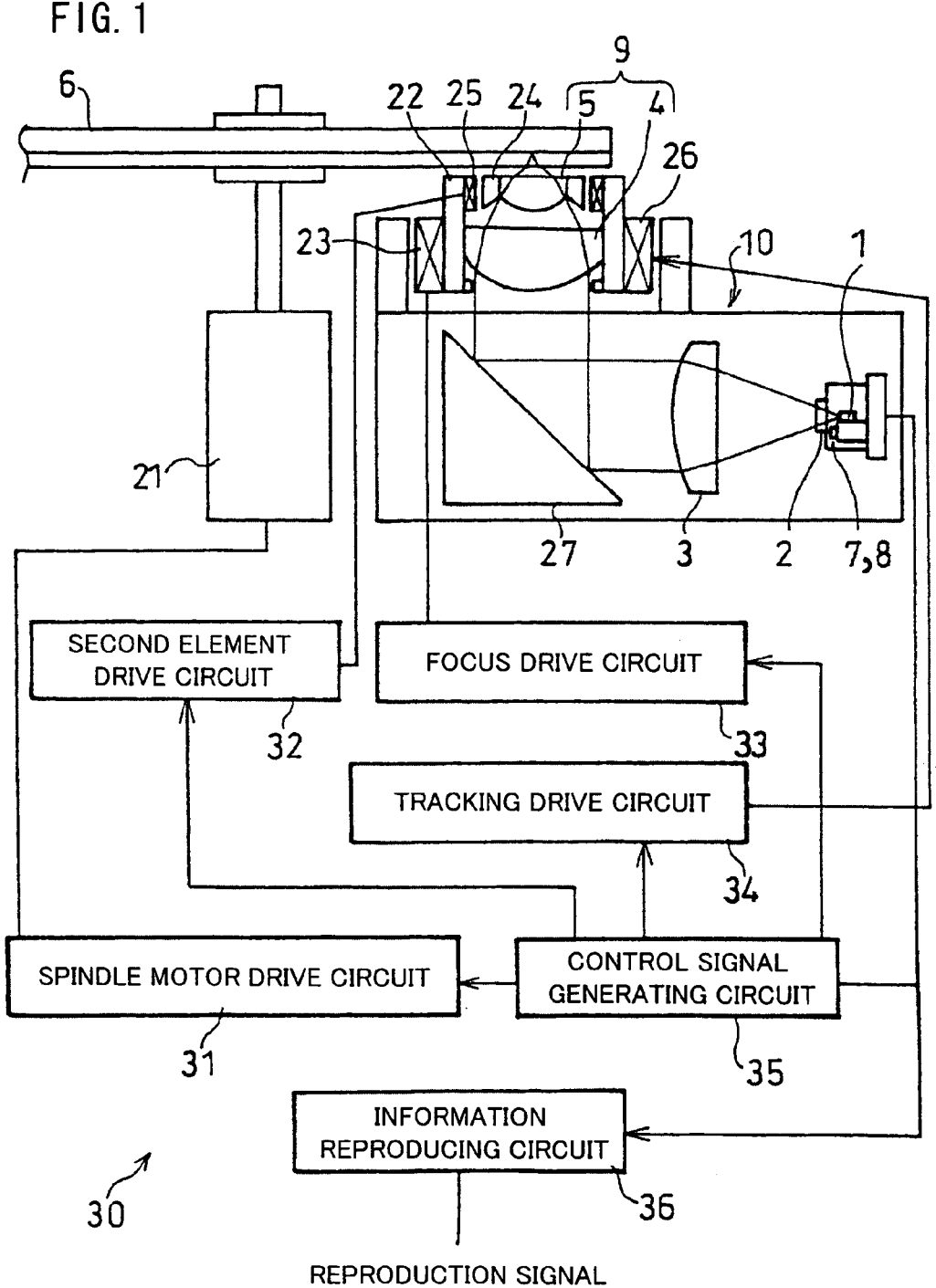
FIG. 1 illustrates one embodiment of the present invention.

As shown in FIG. 1, the optical recording and reproducing apparatus of the present embodiment includes an optical pickup device 10 and a spindle motor 21. The optical pickup device 10 includes a drive control section 30. The optical recording and reproducing apparatus records and reproduces information to and from an optical disk (storing medium) 6.

The spindle motor 21 drives the optical disk 6 so as to rotate the optical disk 6. Note that the optical disk 6 may be of any kind (e.g. a magnetooptical disk) with no particular limitation, as long as the optical disk 6 is an optical disk.

The optical pickup device 10 radiates a light beam into the optical disk 6, so as to record and reproduce information to and from the optical disk 6. The optical pickup device 6 includes a semiconductor laser (light source) 1, a hologram (light beam splitting means) 2, a collimating lens 3, a two-element object lens (focusing optical system) 9, a mirror 27, and detecting devices 7 and 8.

The semiconductor laser 1 is a light source that emits a light beam so as to radiate the light beam into the optical disk 6. Note that the light beam emitted from the semiconductor laser 1 may have any wavelength, with no particular limitation.

The collimating lens 3 converts, into parallel light, the light beam emitted from the semiconductor laser 1 and transmitted through the hologram 2 as a zero-order diffracted light beam.

The two-element object lens 9 includes a first element 4 and a second element 5, which are object lenses provided in this order from a side from which the semiconductor laser 1 radiates the light beam. The first element 4 is held at peripheral portions thereof by a holder 22. Moreover, at outer circumferential portions of the holder 22, there are provided a focus actuator (focus control means; focus offset adjusting means) 23, and a tracking actuator (tracking control means) 26.

The focus actuator 23 performs focus control by moving the holder 22 in a direction of an optical axis, so as to lead the two-element object lens 9 into an appropriate position.

Driving of the tracking actuator 26 is controlled so that the holder 22 is moved in a radial direction (that is, a direction perpendicular to a direction of tracks formed on the optical disk 6 and to the optical axis; i.e. a direction of a radial of the optical disk 6). In this way, it is possible to cause the light beam to trace an information track on the optical disk 6 accurately.

The second element 5 is held at peripheral portions thereof by a holder 24. Moreover, at outer circumferential portions of the holder 24, there is an actuator (spherical aberration correcting means) 25. Driving of the actuator 25 is controlled so that a distance between the first element 4 and the second element 5 is adjusted. In this way, it is possible to correct spherical aberration that occurs in the optical system of the optical pickup device 10.

The mirror 27 is provided between the two-element object lens 9 and the collimating lens 3. The mirror 27 deflects, by approximately 90°, an optical path of the light beam from the two-element object lens 9, or an optical path of a light beam from the collimating lens 3.

Each of the detecting devices 7 and 8 includes a plurality of light receiving elements (light receiving sections). In order to output signals such as a track error signal, the detecting devices 7 and 8 convert light beams respectively received by the receiving elements into electrical signals. Details of the optical pickup device 10 are described later.

The drive control section 30 controls driving of the spindle motor 21 and the optical pickup device 10. The drive control section 30 includes a spindle motor drive circuit 31, a focus drive circuit (focus control means) 33, a tracking drive circuit (tracking control means) 34, a second element drive circuit (spherical error correcting means) 32, a control signal generating circuit (focus error detecting means; spherical aberration detecting means) 35, and an information reproducing circuit 36.

The control signal generating circuit 35 is a control signal generating circuit that generates, from the signals supplied from the detecting devices 7 and 8, control signals for the control circuits.

Specifically, in accordance with the signals supplied from the detecting devices 7 and 8, the control signal generating circuit 35 generates a tracking error signal TES, a focus error signal FES, and a spherical aberration error signal SAES, which are described later. The tracking error signal TES is supplied to the tracking drive circuit 34. The focus error signal FES is supplied to the focus drive circuit 33. The spherical aberration error signal SAES is supplied to the second element drive circuit 32. Then, in accordance with the signals supplied, the drive circuits respectively control driving of members.

The spindle motor drive circuit 31 controls the driving of the spindle motor 21 in accordance with a signal supplied from the control signal generating circuit 35.

The focus drive circuit 33 controls driving of the focus actuator 23 in accordance with the focus error signal FES generated by the control signal generating circuit 35. For example, the driving of the focus actuator 23 is controlled so that, when the focus error signal FES is supplied to the focus drive circuit 33, the two-element object lens is moved in the direction of the optical axis in accordance with a value of the focus error signal FES. In this way, focal point displacement of the two-element object lens that occurs in the direction of the optical axis is corrected.

The tracking drive circuit 34 controls driving of the tracking actuator 26 in accordance with the tracking error signal TES generated by the control signal generating circuit 35.

The second element drive circuit 32 controls driving of the actuator 25 in accordance with the spherical aberration error signal SAES generated by the control signal generating circuit 35. For example, the driving of the actuator 25 is controlled as follows. When the spherical aberration error signal SAES is supplied to the second element drive circuit 32, the second element (lens) 5 is moved in the direction of the optical axis in accordance with a value of the spherical aberration error signal SAES so that the spherical aberration that occurs in the optical system of the optical pickup device 10 is corrected.

However, if the spherical aberration is to be corrected by a spherical aberration correcting mechanism, the distance between the first element 4 and the second element 5 of the two-element object lens 9 may be fixed while the spherical aberration is corrected in accordance with a value of the spherical aberration error signal SAES supplied to the spherical aberration correcting mechanism.

By using the signals supplied from the detecting devices 7 and 8, the information reproducing circuit 36 reproduces information stored in the optical disk 6, so as to generate reproduction signals.

Figure 2:
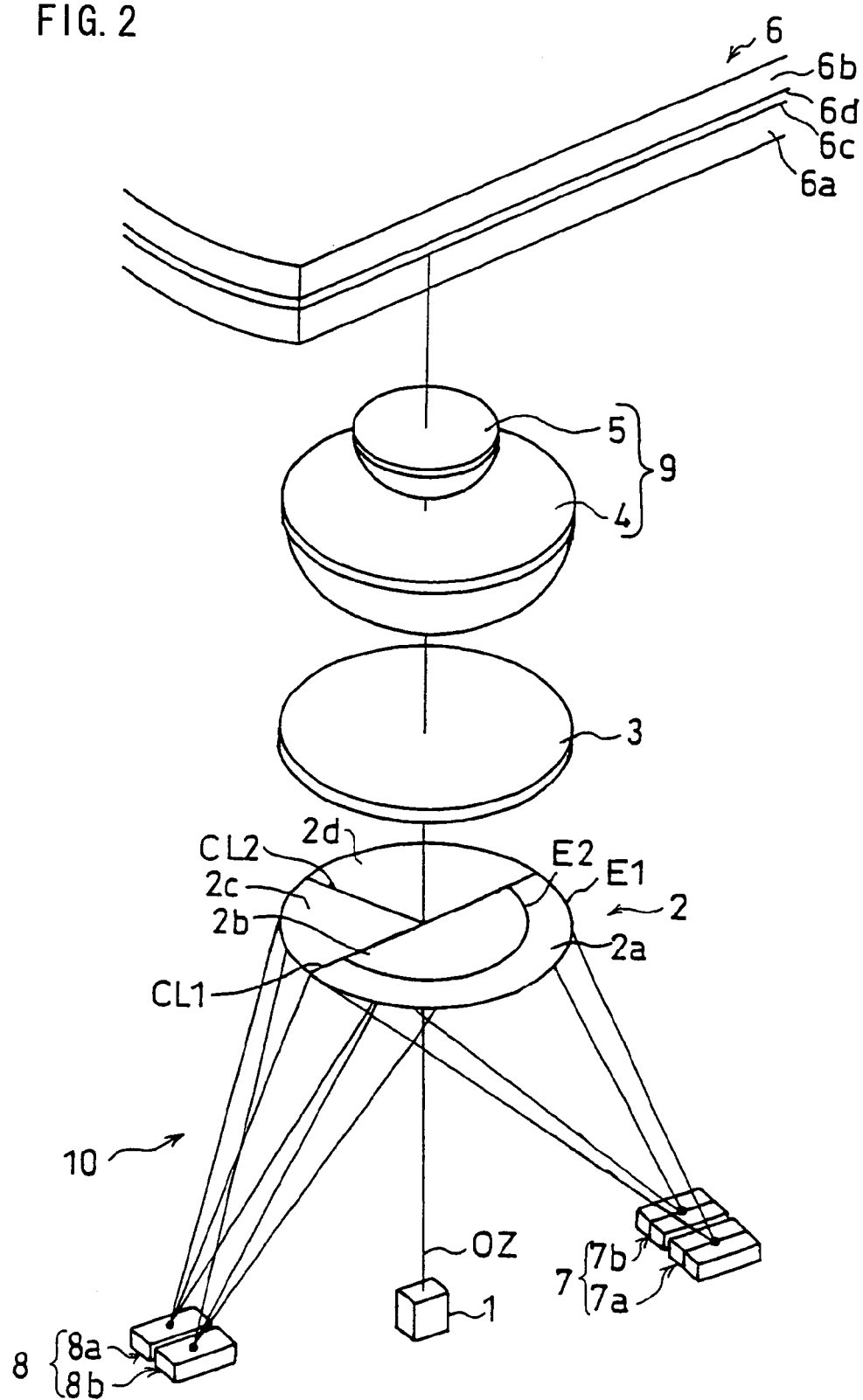
FIG. 2 illustrates an arrangement of a substantial part of the optical recording and reproducing apparatus including the optical pickup device of FIG. 1.

With reference to FIG. 2, details of the optical pickup device 10 are described below. For the purpose of easy explanation, the mirror 27 shown in FIG. 1 is omitted in the optical pickup device 10 shown in FIG. 2.

The optical disk 6 is an optical storing medium. As shown in FIG. 2, the optical disk 6 includes a cover glass 6a, a substrate 6b, and two information storing layers 6c and 6d. The information storing layers 6c and 6d are provided between the cover glass 6a and the substrate 6b. Thus, the optical disk 6 is a two-layered disk. The optical pickup device 10 focuses a light beam on either one of the information storing layers 6c and 6d. In this way, information is reproduced from the information storing layer, or information is recorded in the information storing layer.

Therefore, in the following description, the information storing layer of the optical disk 6 is either one of the information storing layer 6c and 6d. The optical pickup device may focus a light beam on any one of the information storing layers, so as to record or reproduce information.

In the optical pickup device 10, disposed on an optical axis OZ formed between a light beam radiating surface of the semiconductor laser 1 and a light beam reflecting surface of the optical disk 6 are the hologram 2, the collimating lens 3, and the two-element object lens 9 including the first element 4 and the second element 5. The detecting devices 7 and 8 are disposed in focusing positions of the light beams that have been diffracted by the hologram 2.

Specifically, in the optical pickup device 10 having the foregoing arrangement, the light beam radiated from the semiconductor laser 1 is transmitted as a zero-order diffracted light beam through the hologram 2. Then, the light beam is converted by the collimating lens 3 into parallel light. After that, the light beam is transmitted through the two-element object lens 9 including the first element 4 and the second element 5, which are two lenses. Finally, the light beam is focused on the information storing layer (information storing layer 6c or 6d) on the optical disk 6.

On the other hand, the light beam reflected from the information storing layer is incident on the hologram 2 via the second element 5 and the first element 4 of the two-element object lens 9, and the collimating lens 3, in this order. Then, the light beam is diffracted by the hologram 2, and focused on the detecting devices 7 and 8.

The detecting device 7 includes a first light receiving section 7a and a second light receiving section 7b. The detecting device 8 includes a third light receiving section 8a and a fourth light receiving section 8b. The detecting devices 7 and 8 convert, into electrical signals, the light beams focused.

Next, an arrangement of the hologram 2 is described. The hologram 2 includes four regions 2a, 2b, 2c, and 2d. The hologram 2 is divided into two regions by a straight line CL1, which is a divisional line. The two regions are a semicircular region including the regions 2c and 2d, and a semicircular region including the regions 2a and 2b.

One of the two regions formed by division, that is, the semicircular region that includes the regions 2c and 2d, is divided into two regions by a straight line CL2, which is a divisional line. The two regions are the regions 2c and 2d. On the other hand, the semicircular region that includes the regions 2a and 2b is divided into two regions by an arc E2, which is an arc-shaped divisional line. The two regions are the regions 2a and 2b. The region 2a corresponds to a high numerical aperture region of the two-element object lens 9. The region 2b corresponds to a low numerical aperture region of the two-element object lens 9. Therefore, the light beam is split by the regions 2a and 2b into an outer circumferential region and an inner circumferential region.

Thus, the region 2a is a region surrounded by the straight line CL1 orthogonal to the optical axis OZ, and by an arc E1 and an arc E2, both of which center on the optical axis OZ. The region 2b is a region surrounded by the straight line CL1 and the arc E2.

The region 2c is a region surrounded by the straight line CL1, the straight line CL2 orthogonal to the straight line CL1, and by the arc E1. Like the region 2c, the region 2d is a region surrounded by the straight line CL1, the straight line CL2, and the arc E1.

Through the hologram 2, the light beam emitted from a semiconductor laser 1 side is transmitted, as zero-order diffracted light beams, to an optical disk 6 side. Then, reflected light beams from the optical disk 6 side are diffracted by the hologram 2, so as to lead into the detecting devices 7 and 8.

Through the hologram 2, the light beams from the optical disk 6 side is transmitted and diffracted, so that the light beams from the optical disk 6 side are respectively focused on different points according to the regions through which the beams are transmitted and diffracted.

Specifically, among the light beams reflected on the information storing layers of the optical disk 6, a first light beam diffracted by the region 2a of the hologram 2 forms a focusing spot on the first light receiving section 7a. A second light beam diffracted by the region 2b of the hologram 2 forms a focusing spot on the second light receiving section 7b. A third light beam diffracted by the region 2c of the hologram 2 forms a focusing spot on the third light receiving section 8a. A fourth light beam diffracted by the region 2d of the hologram 2 forms a focusing spot on the fourth light receiving section 8b.

Figure 3:
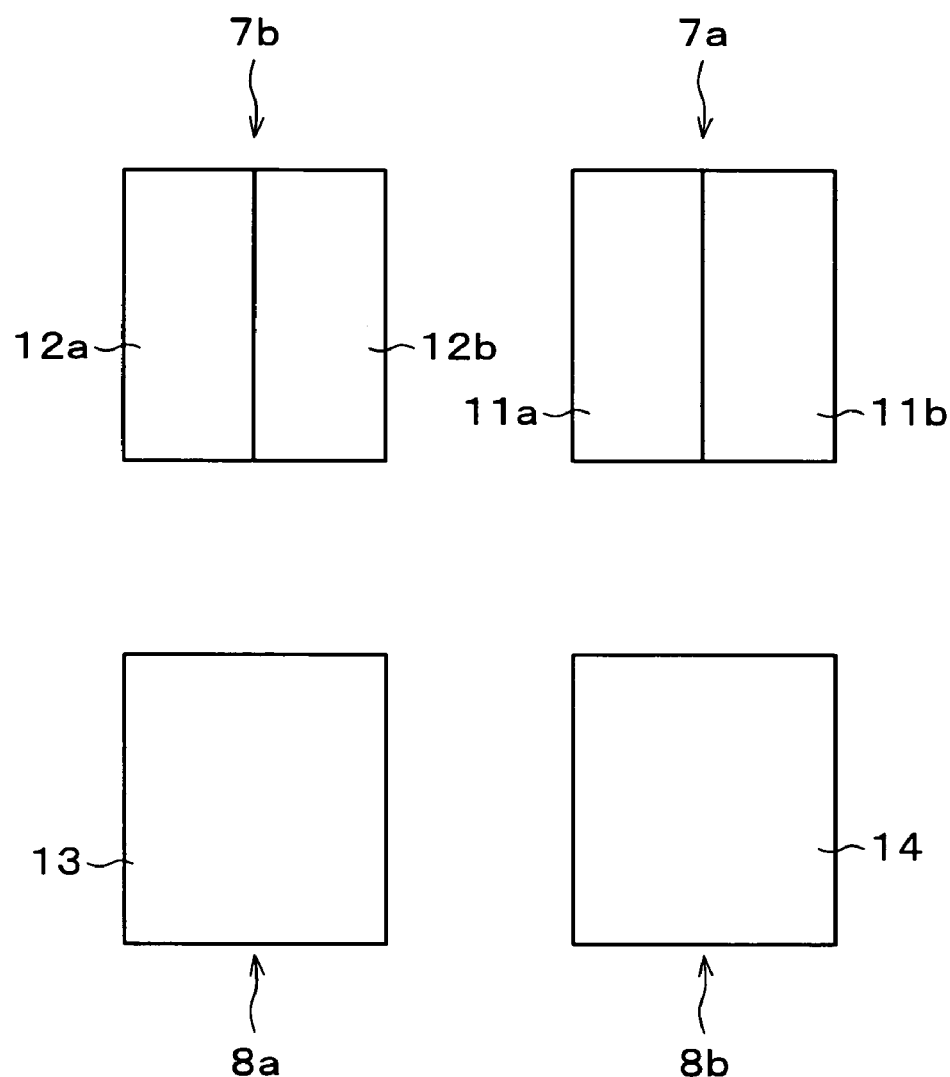
FIG. 3 is a detail view illustrating a detecting device of the optical pickup device of FIG. 1.

Now, with reference to FIG. 3, details of the detecting devices 7 and 8 are described.

As shown in FIG. 3, the detecting device 7 includes the two light receiving sections (the first light receiving section 7a and the second light receiving section 7b). The detecting device 8 includes the two light receiving sections (the third light receiving section 8a and the fourth light receiving section 8b).

Furthermore, the first light receiving section 7a is divided into two: light detectors 11a and 11b. The second light receiving section 7b is divided into two: light detectors 12a and 12b. The light receiving sections are disposed so that the focusing spots of the first light beam and the second light beam are respectively formed on divisional lines of the light receiving sections. The light receiving sections convert the light beams into electrical signals.

The third light receiving section 8a includes a light detector 13, and converts the third light beam into an electrical signal. The fourth light receiving section 8b includes a light detector 14, and converts the fourth light beam into an electrical signal.

The electrical signals obtained at the light detectors are used, by the drive control section 30 (see FIG. 1), for the focal point displacement of the two-element object lens 9 or for reproducing information from the optical disk 6. For example, the electrical signals are supplied to the information reproducing circuit 36 (see FIG. 1), and converted into RF signals (reproduction signals). Here, the RF signals stored in the optical disk 6 are given by a sum of the electrical signals supplied from the light detectors.

Incidentally, in the optical recording and reproducing apparatus having the foregoing arrangement, tracking drive control is performed so as to focus, on a track formed on the optical disk 6, the light beam emitted from the two-element object lens 9. That is, the two-element object lens 9 is moved in the radial direction of the optical disk 6 by driving the tracking actuator 26 (see FIG. 1), so that the light beam is focused on a track.

Here, a tracking error signal TES, which represents an amount of a gap (tracking error) by which the focal point of the light beam is displaced in the radial direction from the track, is given by $$TES = 14S - 13S \qquad (2)$$

where 13S is an electrical signal supplied from the light detector 13, and 14S is an electrical signal supplied from the light detector 14.

A method of measuring the tracking error by calculating the tracking error signal TES from Formula (2) is called a push-pull method. In the push-pull method, used is a phenomenon that a pattern of a reflected and diffracted light beam is unbalanced in the radial direction due to a positional relationship between the track and the focal point (focusing spot) of the light beam. In order to measure an amount of the unbalance (amount of a gap), it is preferable that the straight line CL2, which is a divisional line separating the region 2c and the region 2d of the hologram 2, is orthogonal to the radial direction.

The following describes how to detect and correct a focus error (focal point displacement in the direction of the optical axis) of the two-element object lens 9 by using the electrical signals supplied from the light detectors.

When the focal point is not in the information storing layer, the light beam on the first light receiving section 7a is shifted toward one of the light detectors of the first light receiving section 7a, and the light beam on, the second light receiving section 7b is shifted toward one of the light detectors of the second light receiving section 7b. Therefore, a first error signal F1 (first focus error signal obtained by detecting the focal point displacement which occurs in the direction of the optical axis, of the light beam in the outer circumferential region) is given by $$F1 = 11aS - 11bS \qquad (3)$$

where 11aS is an electrical signal supplied from the light detector 11a that converts, into the electrical signal, the diffracted light beam supplied from the region 2a of the hologram 2, and 11bS is an electrical signal supplied from the light detector 11b that converts, into the electrical signal, the diffracted light beam supplied from the region 2a of the hologram 2. A second error signal F2 (second focus error signal obtained by detecting the focal point displacement, which occurs in the direction of the optical axis, of the light beam in the inner circumferential region) is given by $$F2 = 12aS - 12bS \qquad (4)$$

where 12aS is an electrical signal supplied from the light detector 12a that converts, into the electrical signal, the diffracted light beam supplied from the region 2b of the hologram 2, and 12bS is an electrical signal supplied from the light detector 12b that converts, into the electrical signal, the diffracted light beam supplied from the region 2b of the hologram 2.

If the focal point is not in the information storing layer, output values of the error signals F1 and F2 correspond to amounts of the focal point displacement that occurs in the direction of the optical axis. Here, the focal point displacement (focus error) is an amount of deviation, in the direction of the optical axis, between (1) the focal point on which the light beam passing through the two-element object lens 9 from the semiconductor laser 1 side is focused, and (2) a position of the information storing layer of the optical disk 6.

Therefore, in order to keep the focal point always in the information storing layer, the two-element object lens 9 is moved in the direction of the optical axis OZ in such a manner that the outputs of the first error signal F1 or the second error signal F2 are always zero.

Note that, although the above-described method for detecting the focal point displacement is a method generally called a "knife edge method", the method for detecting the focal point displacement is not limited to the knife edge method. For example, a beam size method may be employed, in which the focal point displacement is detected from a change of a beam size caused by the focal point displacement. In the following description, the knife edge method is employed.

Usually, the focus error signal FES is detected by using an entire effective diameter of the light beam. Therefore, in the present embodiment, the focus error signal FES is given by $$FES = F1 + F2 \qquad (5).$$

The following describes how to detect the spherical aberration that occurs in the two-element object lens 9, which is the focusing optical system.

When the two-element object lens 9 is used, spherical aberration is caused by, for example, a variation of the thickness of the cover glass 6a of the optical disk 6. The spherical aberration causes offset in the focus error signal FES. Therefore, there is a possibility that information cannot be recorded or reproduced, because there is a possibility that the light beam does not match a best image point on the information storing layer even if the output of the focus error signal FES detected is zero. Here, the best image point is a position of an image point at which the beam diameter of the light beam is minimized.

If spherical aberration is caused, focal points vary within the light beam. Therefore, the spherical aberration can be detected by detecting a difference between a focal point in the inner circumferential region of the light beam or a focal point in the outer circumferential region of the light beam. That is, the spherical aberration error signal SAES is given by one of the following formulas (6) to (8):

$$SAES = F1 \qquad (6)$$

$$SAES = F2 \qquad (7)$$

$$SAES = F1 - F2 \qquad (8).$$

Thus, the spherical aberration error signal SAES can be detected by using the first error signal F1 or the second error signal F2.

As described above, the spherical aberration is detected from the focus error signal obtained from at least one of the inner circumferential region of the light beam and the outer circumferential region of the light beam, which are obtained by separation performed at the regions 2a and 2b of the hologram 2.

In this way, it is possible to detect the spherical aberration sensitively.

Figure 4:
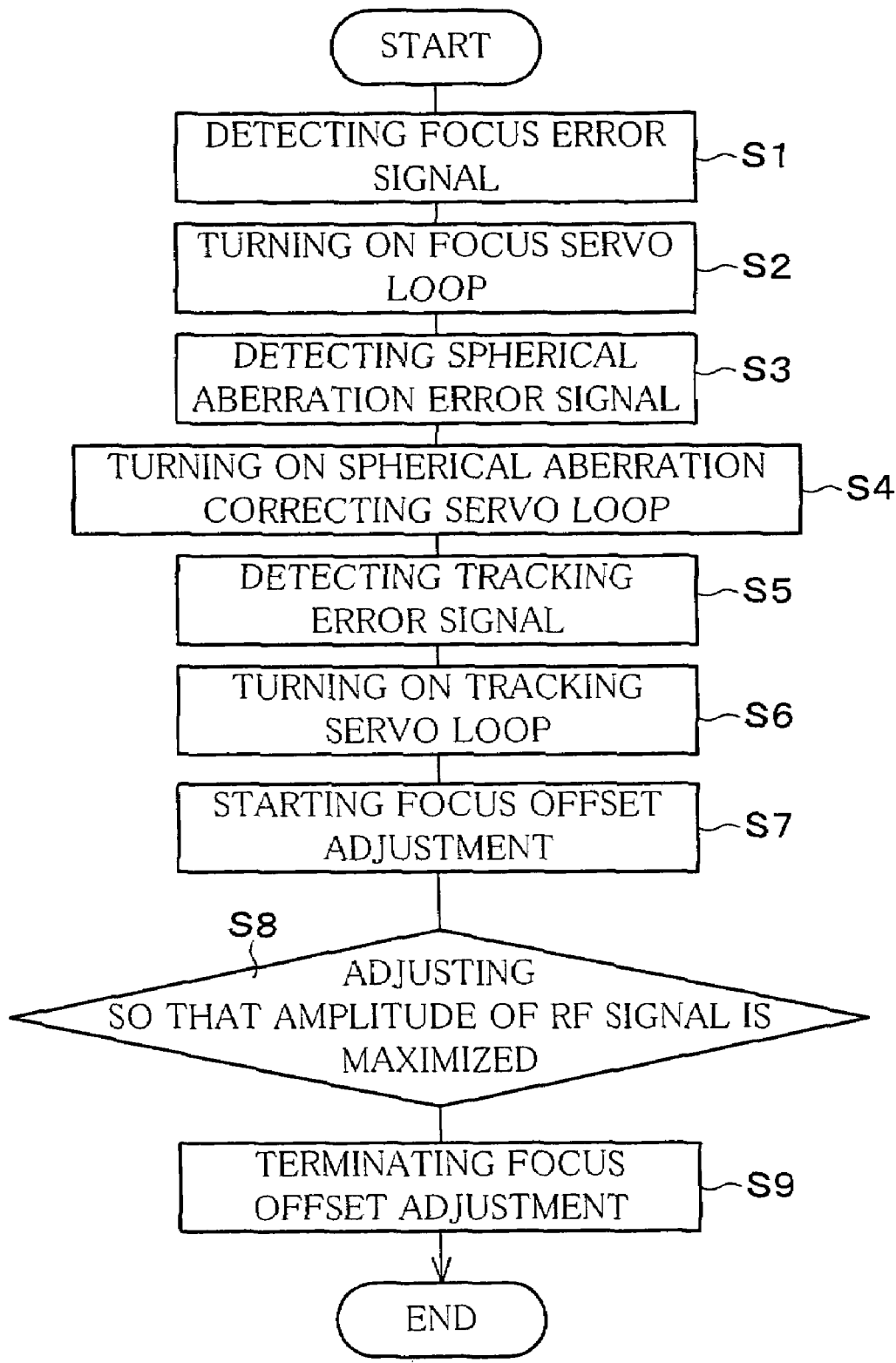
FIG. 4 is a flowchart illustrating a procedure of the focal point adjusting method for a two-element object lens.

Next, a procedure of drive control for the two-element object lens 9 is described, with reference to the flowchart in FIG. 4.

First, as shown in FIG. 4, the focus error signal FES is generated in the control signal generating circuit 35 of the drive control section 30 in accordance with the electrical signal supplied from the optical pickup device 10. That is, the focus error signal FES is detected by the optical pickup device 10 (S1). Then, a focus servo loop is turned ON, and focus control (focus control process) is performed by using the focus drive circuit 33 and the focus actuator 23, so that a value of the focus error signal FES becomes equal to or close to zero (S2).

Next, the spherical aberration error signal SAES is detected in the control signal generating circuit 35 in accordance with the electrical signal supplied from the optical pickup device 10 (S3). Then, a loop of a spherical aberration correcting servo is turned ON, and spherical aberration correcting control (spherical aberration correction process) is performed in accordance with the spherical aberration error signal SAES by using the second element drive circuit 32 and the actuator 25, so that the spherical aberration is corrected, and a value of the spherical aberration error signal SAES becomes equal to or close to zero (S4).

Subsequently, the tracking error signal TES is detected in the control signal generating circuit 35, in accordance with the electrical signal supplied from the optical pickup device 10 (S5). Then, by using the focus drive circuit 33 and the tracking actuator 26, the a loop of a tracking error servo is turned ON, and tracking control is performed, so that a value of the tracking error signal TES becomes equal to or close to zero (S6).

After S1 to S6 are performed, offset adjustment (focus offset adjustment process) for the focus error signal FES is started (S7).

Here, the control signal generating circuit 35 monitors an amplitude of the RF signal, and outputs a monitoring result to the focus drive circuit 33.

After that, by driving the focus actuator 23 in accordance with the monitoring result, the two-element object lens 9 is moved toward the optical disk 6 or away from the optical disk 6, so that the focal point is adjusted to maximize the amplitude of the RF signal (S8). In this way, a just focal point, at which the amplitude of the RF signal is maximized, is determined, and the offset adjustment for the focus error signal FES is terminated (S9).

Thus, it is preferable that the two-element object lens 9 is a lens group including one or more lens (here, the first element 4 and the second element 5), and that the spherical aberration is corrected by moving at least one lens (the second element 5) of the two-element object lens 9.

With this arrangement, it is possible to correct the spherical aberration with a simple arrangement and with high accuracy.

Figure 5:
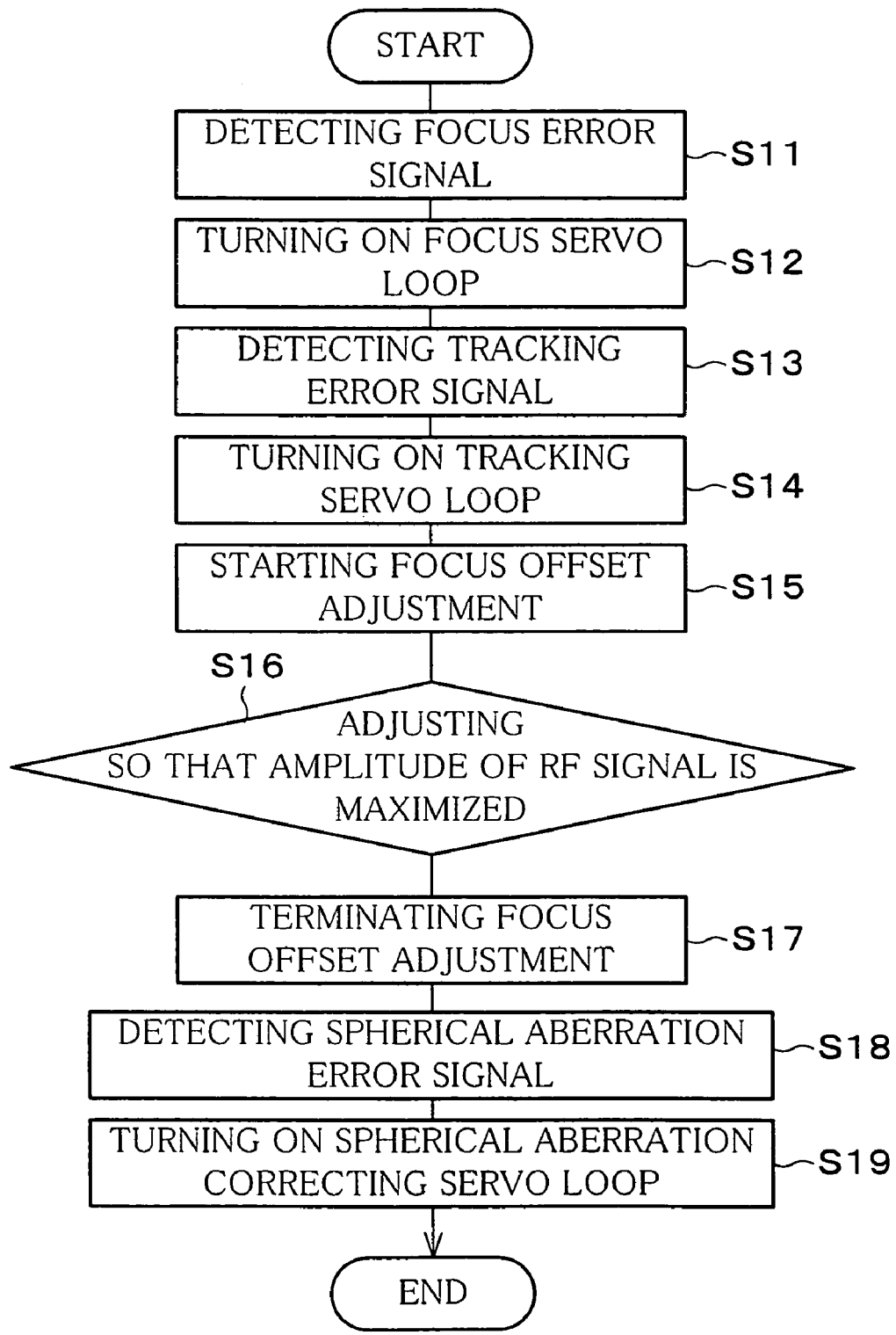
FIG. 5 is a flowchart illustrating a procedure of a focal point adjusting method for a two-element object lens in a comparative example.
Figure 6:
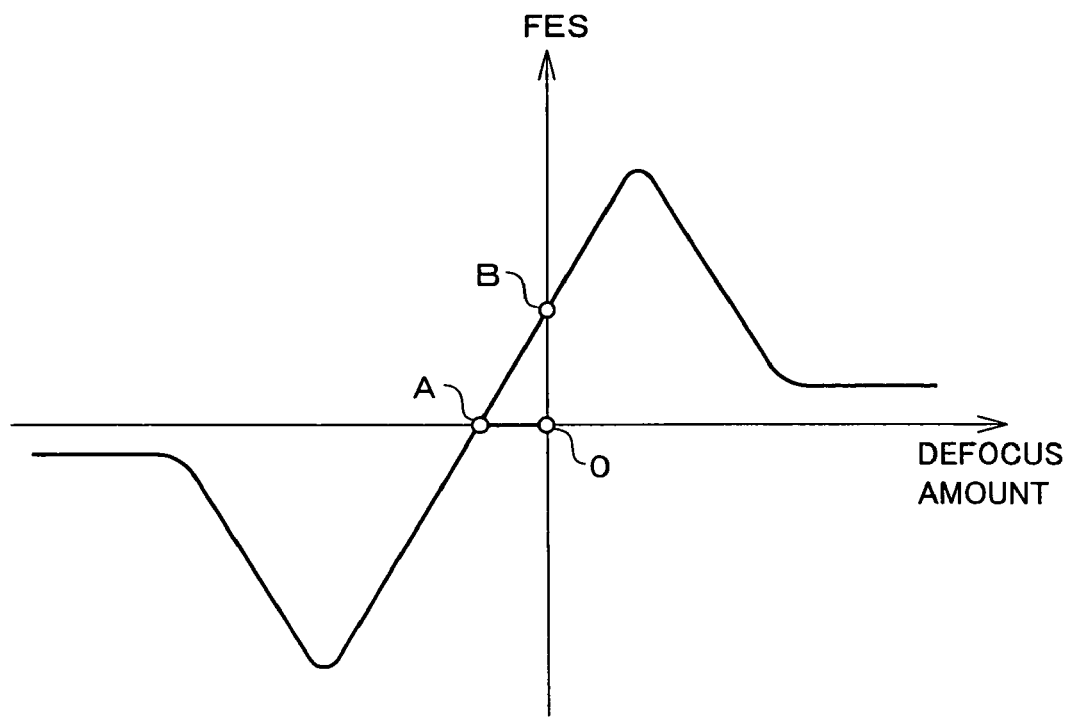
FIG. 6(a) is a graph illustrating a relationship between (1) a focus error signal FES and (2) a defocus amount, before spherical aberration is corrected.
FIG. 6(b) is a graph illustrating a relationship between (1) the focus error signal FES and (2) the defocus amount, after the spherical aberration is corrected.
Figure 6:
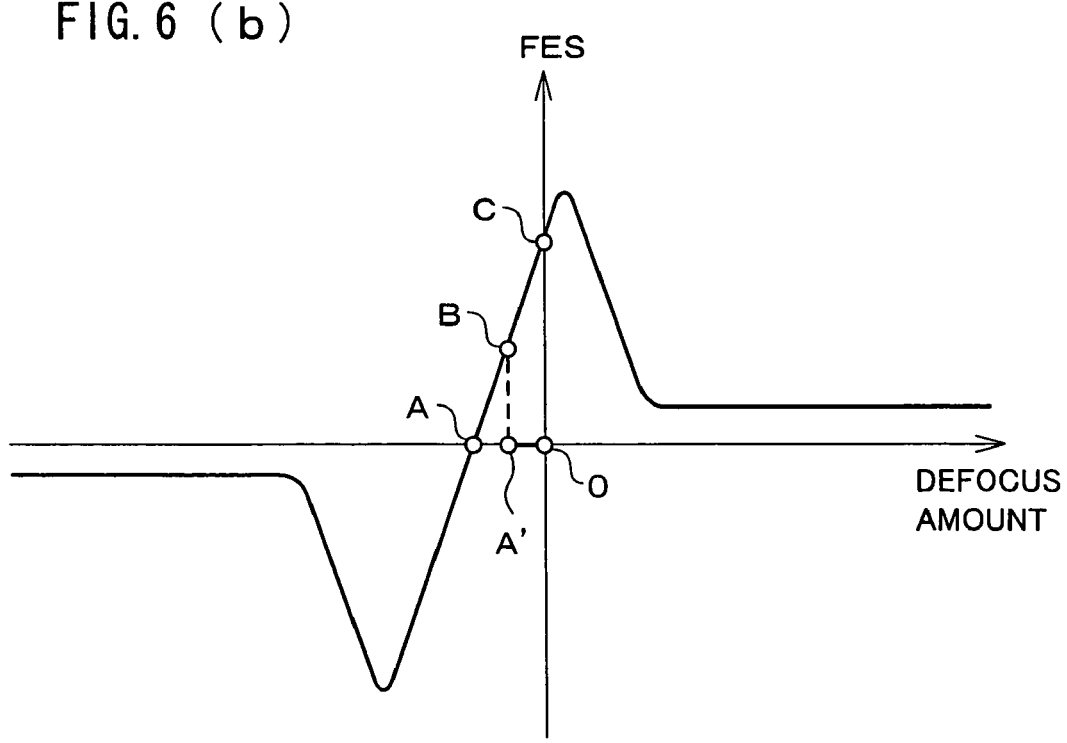

Here, described below with reference to the flowchart of FIG. 5 is a comparative example in which the spherical aberration is corrected and the loop of the spherical aberration correcting servo is turned ON after the offset of the focus error signal FES is adjusted.

In this comparative example, first, the focus error signal FES is detected by the optical pickup device 10 (S11 (equivalent to S1)). Then, the focus servo loop is turned ON, and focus control is performed, so that a value of the focus error signal FES becomes equal to or close to zero (S12 (equivalent to S2)).

Next, the tracking error signal TES is detected by the optical pickup device 10 (S13 (equivalent to S5)). Then, the loop of the tracking error servo is turned ON, and tracking control is performed, so that a value of the tracking error signal TES becomes equal to or close to zero (S14 (equivalent to S6)).

After that, offset adjustment for the focus error signal FES is started (S15 (equivalent to S7)). By driving the focus actuator 23, the focal point is adjusted so that the amplitude of the RF signal is maximized (S16 (equivalent to S8)). In this way, a just focal point, at which the amplitude of the RF signal is maximized, is determined, and the offset adjustment for the focus error signal FES is terminated (S17 (equivalent to S9)).

Thereafter, the spherical aberration error signal SAES is detected (S18 (equivalent to S3)). Then, the loop of the spherical aberration correcting servo is turned ON, and spherical aberration correcting control is performed, so that a value of the spherical aberration error signal SAES becomes equal to or close to zero (S19 (equivalent to S4)).

The offset adjustment for the focus error signal FES in such a case is described with reference to FIGS. 6(a) and 6(b).

FIG. 6(a) is a graph illustrating the focus error signal FES before the spherical aberration is corrected. In FIG. 6(a), the point O indicates a case in which a defocus amount of the two-element object lens 9 is zero. The defocus amount is zero when the just focal point of the light beam matches the information storing layer of the optical disk 6.

Here, as shown in FIG. 6(a), the focus error signal FES before the spherical aberration is corrected is such that the point A, at which the focus error signal FES is zero, does not match the point O, at which the defocus amount is zero. Therefore, there is offset of an amount from the point A to the point O. Described below is a case in which a servo system introduction movement is performed under this condition.

First, when the focus error signal FES is detected and the loop of the focus servo is turned ON, the focus actuator 23 drives the two-element object lens 9, so that the focus error signal FES becomes zero. That is, the point A is the target of the focus control.

Next, not the correction of the spherical aberration, but the offset adjustment for the focus error signal FES is performed. Actually, while the RF signal is monitored, the focus actuator 23 is driven so that the amplitude of the RF signal is maximized. When the offset adjustment for the focus error signal FES is thus performed, the focus actuator 23 performs focus control targeted at an output of the point B. When spherical aberration is corrected under an offset-free state after the offset adjustment for the focus error signal FES is performed, the focus error signal FES looks as in FIG. 6(b).

Usually, when spherical aberration is corrected, a slope of a linear portion of the focus error signal FES becomes steep. That is, the spherical aberration of the two-element object lens 9 becomes so small as to be negligible. Therefore, the focus error signal FES has high sensitivity.

However, a just focus is no longer attained at the point B, because the slope of the linear portion of the focus error signal FES is steep. Therefore, when focus control targeted at the point B is performed, the offset of an amount from the point A to the point O is left.

As a result, if, as shown in FIG. 5, the spherical aberration is corrected and the loop of the spherical aberration correcting servo is turned ON after the offset of the focus error signal FES is adjusted, offset cannot be eliminated from the focus error signal FES.

On the other hand, if the offset of the focus error signal FES is adjusted after the spherical aberration is corrected, the focus actuator 23 is driven so that the offset becomes zero after the slope of the linear portion of the focus error signal FES becomes steep.

Thus, by adjusting the offset of the focus error signal FES after the amount of the spherical aberration is reduced as much as possible by correcting the spherical aberration and turning ON the loop of the spherical aberration correcting servo, it is possible to eliminate offset from the focus error signal FES.

As described above, in the present embodiment, the spherical aberration is corrected by, for example, moving the second element 5, so as to change a distance between the first element 4 and the second element 5, which constitute the two-element object lens 9. That is, in order to correct the spherical aberration, the light beam is caused to diverge or converge, so that a divergent or convergent light beam is incident into the optical disk 6.

However, usually, when a divergent or convergent light beam is incident, a magnification of the optical system is changed, so that a sensitivity of the focus error signal FES is changed. Therefore, if the spherical aberration is corrected after the offset adjustment for the focus error signal FES is performed, the sensitivity of the focus error signal FES is changed, thereby leaving offset.

On the other hand, what is carried out in the offset adjustment for the focus error signal FES is merely adjusting the focal point displacement by driving the focus actuator 23 in the direction of the optical axis. This driving causes no spherical aberration in the optical system. Therefore, the offset adjustment for the focus error signal FES causes no additional spherical aberration in the optical system.

Therefore, it is preferable that, as in an adjustment procedure in the focal point adjusting method shown in FIG. 4, information is recorded in or reproduced from the optical recording medium after the optical pickup device is adjusted, so that no focus error is left therein, by performing the offset adjustment for the focus error signal FES after the spherical aberration is corrected.

As described above, the focal point adjusting method of the present invention for adjusting the focal point of the focused light beam includes:

a focus controlling process in which an output of the focus error signal FES is controlled so that the output becomes close to zero, the focus error signal FES being obtained by detecting focal point displacement that occurs in the direction of the optical axis of the light beam focused by passing through the two-element object lens 9;

a spherical aberration correcting process in which spherical aberration that occurs with respect to the light beam is corrected; and a focus offset adjusting process in which offset in the focus error signal FES is adjusted.

Therefore, the optical pickup device 10 employing the focal point adjusting method includes:

the semiconductor laser 1;

the two-element object lens 9 that focuses a light beam radiated from the semiconductor laser 1 and reflected on the optical disk 6;

the control signal generating circuit 35, which is focus error detecting means for detecting the focus error signal FES indicative of the focal point displacement that occurs in the direction of the optical axis of the light beam, and which detect spherical aberration of the two-element object lens 9;

the focus drive circuit 33 and the focus actuator 23, which control an output of the focus error signal FES so that the output becomes close to zero, and which are focus offset control means for adjusting offset of the focus error signal FES; and the actuator 25 and the second element drive circuit 32 for correcting spherical aberration in accordance with the focus error signal FES, the focus drive circuit 33 and the focus actuator 23, which are the focusing offset adjusting means, controlling the output of the focus error signal FES so that the output becomes close to zero, and adjusting the offset of the focus error signal FES after the spherical aberration is corrected by the actuator 25 and the second element drive circuit 32.

According to this arrangement, the offset of the focus error signal FES is adjusted after (1) the output of the focus error signal is controlled to be zero in the focus controlling process, and (2) the spherical aberration in the two-element object lens 9 is reduced to be negligible by steepening the slope of the linear portion of the focus error signal FES.

Thus, if the offset of the focus error signal FES is adjusted after the spherical aberration is corrected with respect to the focus error signal FES whose output is zero, the offset is adjusted to be zero after the slope of the linear portion of the focus error signal is steepened.

Therefore, by adjusting the offset of the focus error signal FES after the amount of the spherical aberration that occurs in the two-element object lens 9 is reduced as much as possible by (1) correcting the spherical aberration, and, for example, (2) turning ON the loop of the spherical aberration correcting servo, it is possible to eliminate offset from the focus error signal FES.

In this way, it is possible to provide a focal point adjustment method with which the spherical aberration is corrected stably, and the focal point displacement that occurs in the direction of the optical axis is controlled stably, so that, for example, the focal point of the light beam radiated is not displaced, and to provide an optical pickup device 10 employing the focal point adjusting method.

Incidentally, as shown in Formulas (6) to (8), in the spherical aberration error signal SAES, the first error signal F1 obtained in the first light receiving section 7a of the detecting device 7, or the second error signal F2 obtained in the second light receiving section 7b of the detecting device 7, is used. In other words, the focus error signal in the inner circumferential portion of the light beam or the focus error signal in the outer circumferential portion of the light beam is used in the spherical aberration error signal SAES.

Thus, by performing the offset adjustment for the focus error signal FES, offset is caused in the spherical aberration error signal SAES. Therefore, from the spherical aberration error signal SAES, it is necessary to remove crosstalk from the focus error signal FES.

In such a case, it is preferable to correct the spherical aberration error signal SAES by using the focus error signal FES, so as to remove the crosstalk of the focus error signal FES.

That is, it is preferable that the spherical aberration error signal SAES is given by $$SAES = F1 - (F1+F2) \times K1 \qquad (9),$$

where K1 is a coefficient, or $$SAES = F2 - (F1+F2) \times K2 \qquad (10),$$

where K2 is a coefficient.

With this setting, it is possible to remove, from the spherical aberration error signal SAES, the crosstalk from the focus error signal FES.

Moreover, the spherical aberration error signal SAES may be given by $$SAES = F1 - F2 \times K3 \qquad (11),$$

where K3 is a coefficient.

With this setting also, it is possible to remove, from the spherical aberration error signal SAES, the crosstalk from the focus error signal FES. Therefore, it is possible to accurately detect the spherical aberration from the spherical aberration error signal SAES.

Here, K1, K2, and K3 may be decided so that the crosstalk from the focus error signal FES becomes small.

By monitoring the RF signal, the offset of the focus error signal FES is so adjusted that the amplitude of the RF signal is maximized. Note that, for example, in case of an unrecorded optical disk 6, offset can be adjusted by using an RF signal modulated at a pit in an address section.

Moreover, there are cases in which the RF signal cannot be used for the offset adjustment because no modulated component appears in the RF signal of the unrecorded optical disk 6, such as a case in which the optical disk 6 has a wobble structure, that is, if the optical disk 6 has undulating track grooves, instead of a pit in the address section, so as to store address information. In such a case, the tracking error signal TES may be used instead of the RF signal, so that the offset adjustment for the focus error signal FES is performed by using the amplitude of the tracking error signal TES.

Figure 7:
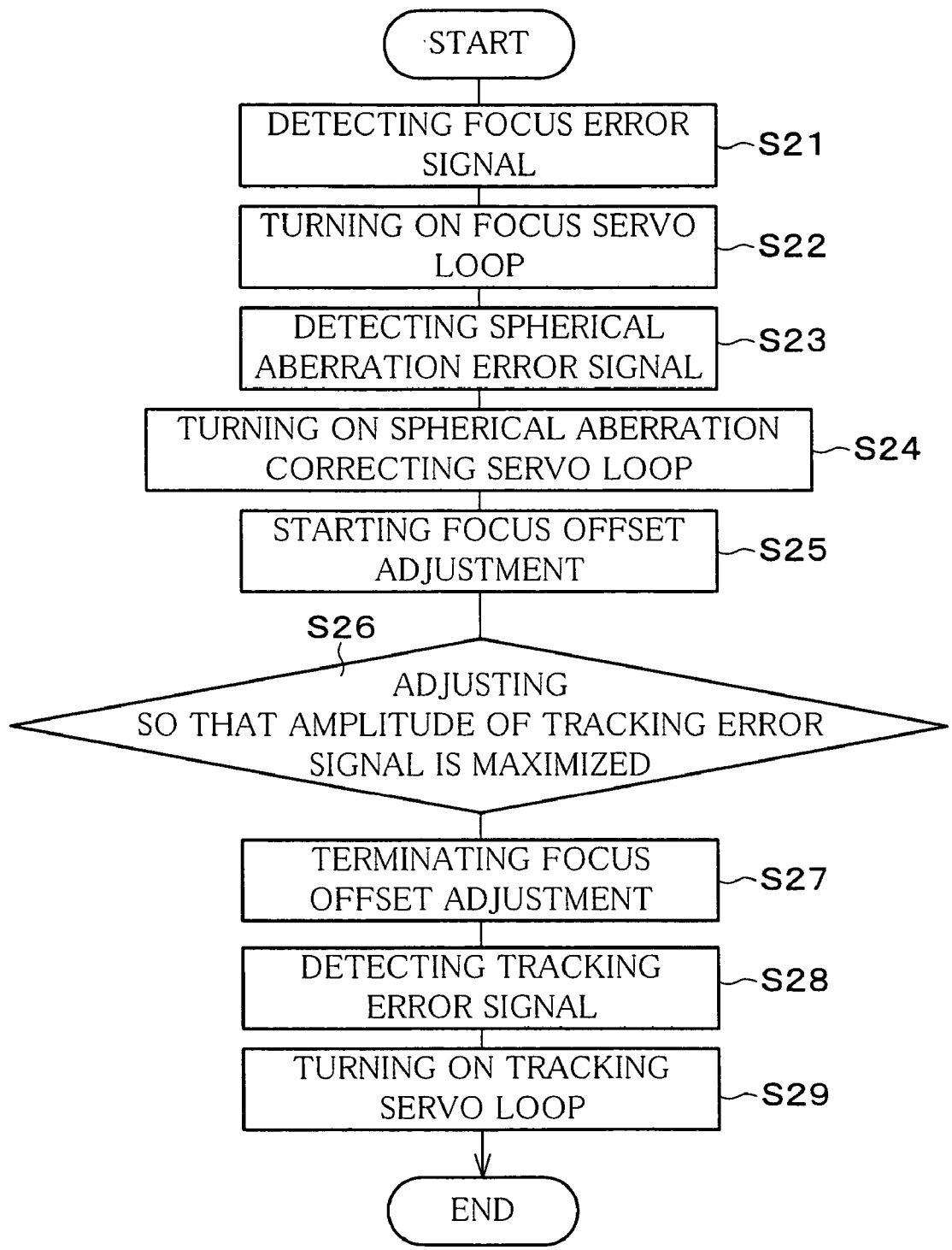
FIG. 7 is a flowchart illustrating another procedure of a focal point adjusting method for a two-element object lens.

FIG. 7 illustrates a focal point adjusting method of this case.

First, the focus error signal FES is detected (S21). Then, the focus servo loop is turned ON, and focus control is performed, so that a value of the focus error signal FES becomes equal to or close to zero (S22).

Next, the spherical aberration error signal SAES from the optical pickup device 10 is detected (S23). Then, the loop of the spherical aberration correcting servo is turned ON, and spherical aberration correcting control is performed, so that a value of the spherical aberration error signal SAES becomes equal to or close to zero (S24).

After that, the offset adjustment for the focus error signal FES is started (S25). Then, by driving the focus actuator 23, the focal point is adjusted until the amplitude of the tracking error signal TES is maximized (S26).

In this way, a just focal point, at which the amplitude of the tracking error signal TES is maximized, is determined, and the offset adjustment for the focus error signal FES is terminated (S27).

Thereafter, the tracking error signal TES from the optical pickup device 10 is detected (S28). Then, the loop of the tracking error servo is turned ON, and tracking control is performed, so that a value of the tracking error signal TES becomes equal to or close to zero (S29).

By thus adjusting the offset of the focus error signal FES after the spherical aberration is corrected, it is possible to eliminate offset from the focus error signal FES even if the offset of the focus error signal FES is adjusted before turning ON the loop of the tracking error servo (i.e. before the tracking control).

Moreover, in case the optical disk 6 has the wobble structure, the offset of the focus error signal FES may be adjusted by using an amplitude of a wobble signal. In such a case, after the tracking servo loop is turned ON, the wobble signal is detected from the tracking error signal TES, and the offset of the focus error signal FES is adjusted so that the amplitude of the wobble signal is maximized.

In case the optical disk 6 has a plurality of information storing layers, it is ensured, not only when the optical disk 6 is loaded (disk load time), but also when the focal point jumps from one of the information storing layers into another of the information storing layers (inter-layer jump time), that offset is not left in the focus error signal FES if the offset adjustment is performed according to the foregoing procedure (i.e. if the offset adjustment is performed after correcting the spherical aberration and turning ON the loop of the spherical aberration correcting servo).

Moreover, in case an inter-layer jump is performed among a plurality of information storing layers, it may be so arranged that (1) spherical aberration that occurs due to thickness of the information storing layers is corrected in advance, and an amount of correction of the spherical aberration is finely adjusted after the jump, or (2) the spherical aberration is not corrected before the jump but spherical aberration that occurs due to the thickness of the information storing layers and due to unevenness of the thickness of the optical disk 6 is corrected after the jump.

Incidentally, as described above, in the optical pickup device 10, the focus error signal FES is used as the spherical aberration error signal. That is, as a reference signal for the spherical aberration correction, the focus position displacement between the light beam in the inner circumferential portion and the light beam in the outer circumferential portion is used.

This aims at correcting, in real time when information is recorded or reproduced, the spherical aberration that occurs due to the unevenness of the thickness of the optical disk 6 (which is an optical storing medium) if the unevenness of the thickness is significant.

However, depending on manufacturing art for the optical storing medium, the unevenness of the thickness of the optical disk 6 can be kept less significant.

If the unevenness of the thickness of the optical disk 6 is kept less significant, it is sufficient that the spherical aberration that occurs due to the unevenness of the thickness of the optical disk 6 is corrected only in the disk load time and the inter-layer jump time. That is, it is not necessary to perform the spherical aberration correction in real time.

If the spherical aberration is corrected only in the disk load time and the inter-layer jump, time, the amplitude of the RF signal or the amplitude of the tracking error signal TES can be used as a reference signal indicative of the amount of the spherical aberration.

By thus using the amplitude of the RF signal or the amplitude of the tracking error signal TES in performing the spherical aberration correction, it is possible to use an optical system having an arrangement simpler than that of a case in which the spherical aberration is corrected in real time.

Figure 8:
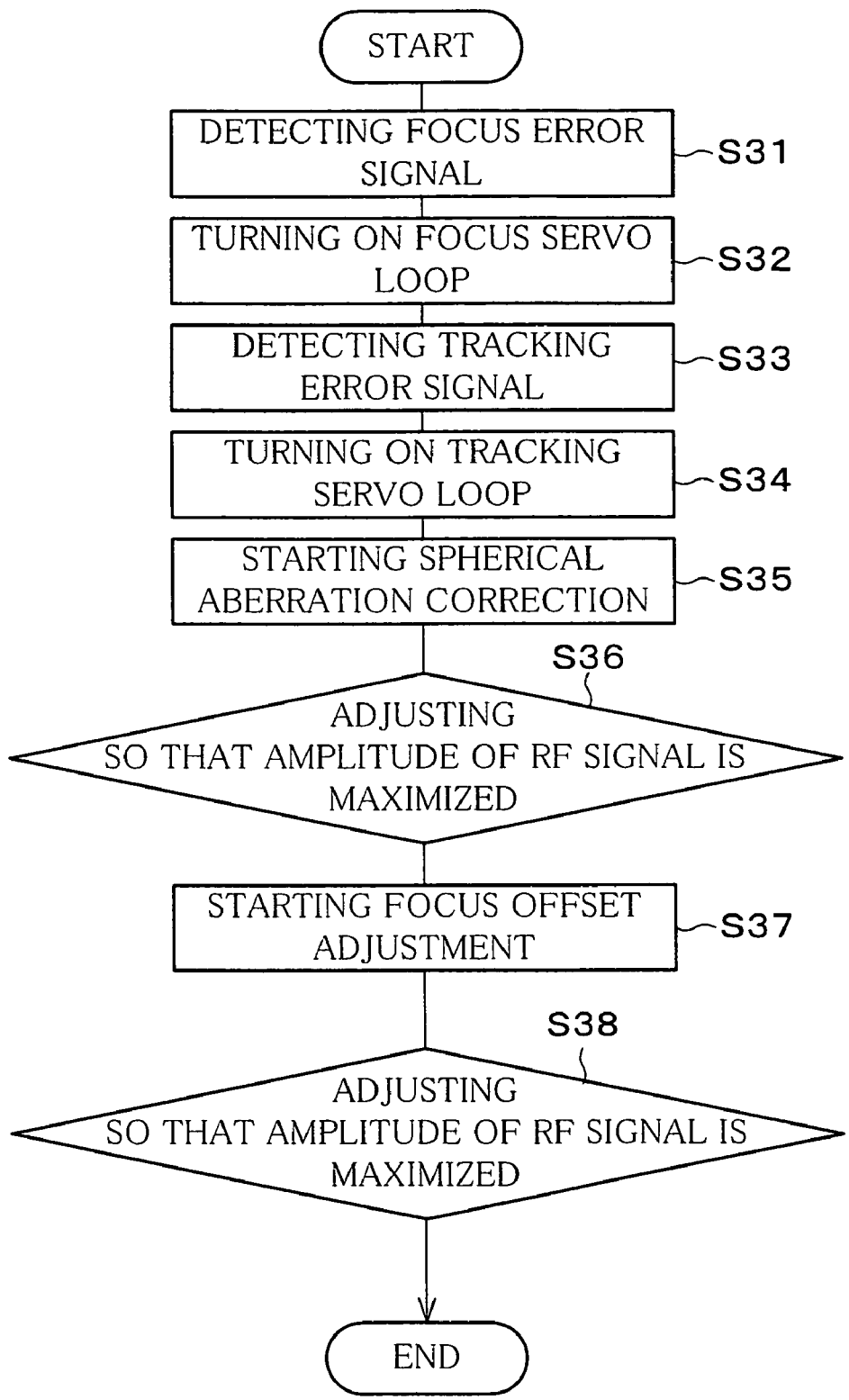
FIG. 8 is a flowchart illustrating an example of a procedure of the focal point adjusting method for the two-element object lens. This example is for a case in which an RF signal is used for correcting the spherical aberration.

With reference to the flowchart in FIG. 8, the following describes an example of a procedure of drive control for the two-element object lens 9 for a case in which the RF signal is used for correcting the spherical aberration.

First, the focus error signal FES is detected (S31). Then, the focus servo loop is turned ON, and focus control is performed, so that the value of the focus error signal FES becomes equal to or close to zero (S32).

Next, the tracking error signal TES is detected (S33). Then, the tracking servo loop is turned ON, and tracking control is performed, so that the value of the tracking error signal TES becomes equal to or close to zero (S34).

Then, while the amplitude of the RF signal is monitored by the control signal generating circuit 35, the spherical aberration correction is started (S35). That is, by using the actuator 25, the distance between the first element 4 and the second element 5, which constitute the two-element object lens 9, is changed, so as to correct the spherical aberration in such a manner that the amplitude of the RF signal is maximized (S36).

Thereafter, while the amplitude of the RF signal is monitored continually, the offset adjustment for the focus error signal FES is started (S37). That is, the control signal generating circuit 35 monitors the amplitude of the RF signal, and supplies a monitoring result to the focus drive circuit 33.

Then, by driving the focus actuator 23 in accordance with the monitoring result, the two-element object lens 9 is moved toward the optical disk 6 or away from the optical disk 6, so that the focal point is adjusted to maximize the amplitude of the RF signal. In this way, the just focal point, at which the amplitude of the RF signal is maximized, is determined, and the offset adjustment for the focus error signal FES is terminated (S38). Here, the adjustment is terminated as a whole.

Figure 9:
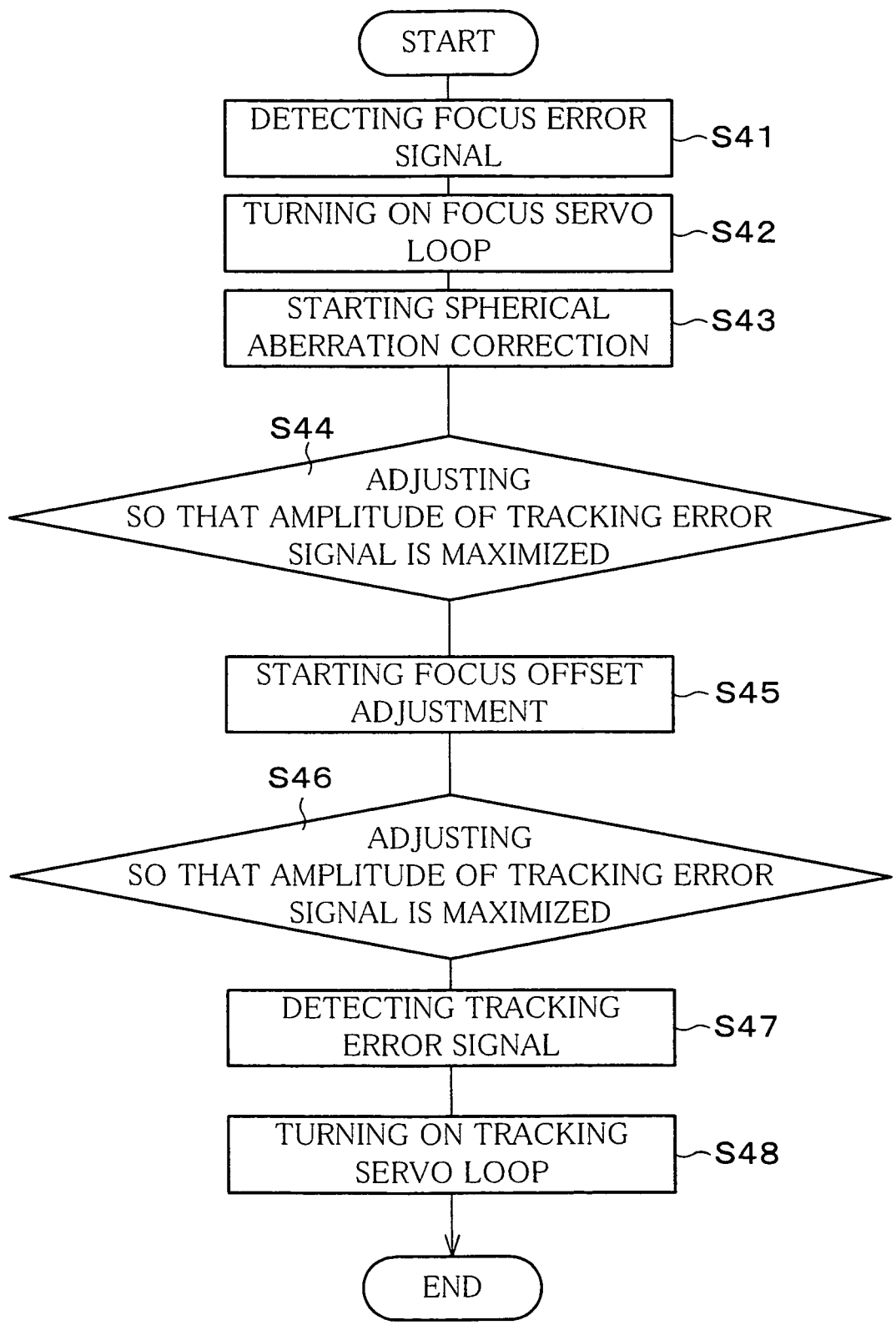
FIG. 9 is a flowchart illustrating an example of a procedure of the focal point adjusting method for the two-element object lens. This example is for a case in which a tracking error signal TES is used for correcting the spherical aberration.

With reference to the flowchart in FIG. 9, the following describes an example of a procedure of driving control for the two-element object lens 9 for a case in which the tracking error signal TES is used for correcting the spherical aberration.

First, the focus error signal FES is detected (S41). Then, the focus servo loop is turned ON, and focus control is performed, so that the value of the focus error signal FES becomes equal to or close to zero (S42).

Then, while the amplitude of tracking error signal TES is monitored by the control signal generating circuit 35, correction of the spherical aberration is started (S43). That is, by using the actuator 25, the distance between the first element 4 and the second element 5, which constitute the two-element object lens 9, is changed, so as to correct the spherical aberration in such a manner that the amplitude of the tracking error signal TES is maximized (S44).

Thereafter, while the amplitude of the tracking error signal TES is monitored continually, the offset adjustment for the focus error signal FES is started (S45). That is, the control signal generating circuit 35 monitors the amplitude of the tracking error signal TES, and supplies a monitoring result to the focus drive circuit 33.

Then, by driving the focus actuator 23 in accordance with the monitoring result, the two-element object lens 9 is moved toward the optical disk 6 or away from the optical disk 6, so that the focal point is adjusted to maximize the amplitude of the tracking error signal TES (S46).

Then, the tracking error signal TES is detected (S47). After that, the loop of the tracking servo is turned ON, and tracking control is performed, so that the value of the tracking error signal TES becomes equal to or close to zero (S48). Here, the adjustment is terminated.

Note that the spherical aberration correction may be performed by employing a method called SAM (Sequenced Amplitude Margin). In SAM, used is a path metric difference in a Viterbi decoding, which is one of the methods of evaluating quality of a signal as a reference signal indicative of the amount of the spherical aberration.

In the foregoing focal point adjusting method in which spherical aberration correction is performed only at the disk load time and at the inter-layer jump time, correction of the spherical aberration and the offset adjustment for the focus error signal FES are performed only once, respectively. However, the focal point adjusting method is not limited to this arrangement. For example, if the offset amount of the focus error signal FES or a remaining amount of spherical aberration is initially (i.e. before focal point adjustment is performed) large, there are cases in which quality of the RF signal is not sufficiently improved even if the correction of spherical aberration and the offset adjustment for the focus error signal FES are performed once, respectively.

In such cases, the loop of the correction of spherical aberration and the loop of the offset adjustment for the focus error signal FES may be respectively executed plural times with an aim of improving accuracy of the adjustment, so that the quality of the RF signal is improved. Note that it is preferable to perform the offset adjustment for the focus error signal FES at the end of the loop, because the sensitivity of the focus error signal is changed by the spherical aberration correction also in this case.

In the present embodiment, the two-element object lens 9 including the two lenses (the first element 4 and the second element 5) is used as the object lens. However, the object lens may be a single lens, so that the apparatus can be assembled in simple steps.

In the present embodiment, spherical aberration is corrected by changing the distance between the first element 4 and the second element 5, which constitute the two-element object lens 9. However, the present invention is not limited to this arrangement. For example, the collimating lens 3 may be moved so as to change a distance between the semiconductor laser 1 and the collimating lens 3. In this case, the light beam emitted from the semiconductor laser 1 and transmitted through the collimating lens 3 becomes non-parallel, thereby generating spherical aberration. By using the spherical aberration, the spherical aberration in the optical system of the optical pickup device 10, that is, the spherical aberration in the two-element object lens 9, can be corrected.

Moreover, a spherical aberration correcting mechanism may be inserted between the two-element object lens 9 and the collimating lens 3. The spherical aberration correcting mechanism constitutes an optical system that causes spherical aberration when a light beam is transmitted through the spherical aberration correcting mechanism.

For example, as the spherical aberration correcting mechanism, an afocal optical system made by combining a convex lens having positive power and a concave lens having negative power may be used. By adjusting a distance between the convex lens and the concave lens, it is possible to cause spherical aberration. Moreover, as another arrangement of the spherical aberration correcting mechanism, an afocal optical system made by combining two convex lenses respectively having positive power may be used. In this case also, it is possible to cause spherical aberration by adjusting a distance between the two convex lenses. Moreover, as the spherical aberration correcting mechanism for causing spherical aberration, a liquid crystal element having spherical aberration may be used.

By thus providing the spherical aberration correcting mechanism, it is possible to correct the spherical aberration in the two-element object lens 9 by using the spherical aberration caused by the spherical aberration correcting mechanism.

Note that the specific embodiments and examples described in the "BEST MODE FOR CARRYING OUT THE INVENTION" section are only for clarifying technical contents of the present invention. Therefore, the scope of the present invention should not be interpreted as being limited to these specific examples. The present invention may be varied in many ways within the scope of the spirits of the present invention and the following claims.

INDUSTRIAL APPLICABILITY

According to the arrangement or method of the present invention, spherical aberration is corrected stably, and focal point displacement control in the direction of the optical axis can be performed stably, so that the focal point of the light beam radiated is not displaced. Therefore, the present invention is suitable for use in a focal point adjusting method in which the focal point displacement that occurs in the focusing optical system is detected and the focal point is adjusted, and for use in an optical pickup device employing the focal point adjusting method.

The invention claimed is:

1. A focal point adjusting method for adjusting a focal point of a focused light beam, comprising:

a focus controlling process in which an output of a focus error signal is controlled so that the output becomes close to zero, the focus error signal being obtained by detecting focal point displacement that occurs in a direction of an optical axis of the light beam focused by passing through a focusing optical system;

a spherical aberration correcting process in which spherical aberration that occurs with respect to the focused light beam is corrected; and a focus offset adjusting process in which offset in the focus error signal is determined and adjusted, said focus offset adjusting process being performed after said spherical aberration correcting process corrects for spherical aberration.

2. The focal point adjusting method as set forth in claim 1, wherein:

the spherical aberration is detected from a focus error signal obtained from at least one of (a) an inner circumferential region of a reflected light beam and (b) an outer circumferential region of the reflected light beam, which are split from each other by a light beam splitting means.

3. The focal point adjusting method as set forth in claim 2, wherein:

a spherical aberration error signal SAES, which is indicative of the spherical aberration, satisfies any one of the following:

$$SAES=F1-(F1+F2)\times K1;$$

$$SABS=F2-(F1+F2)\times K2; \text{ and}$$

$$SAES=F1-F2\times K3,$$

where F1 is a first focus error signal obtained by detecting focal point displacement, which occurs in the direction of the optical axis, of the outer circumferential region of the reflected light beam, F2 is a second focus error signal obtained by detecting the focal point displacement, which occurs in the direction of the optical axis, of the inner circumferential region of the reflected light beam, and K1 K2, and K3 are coefficients.

4. The focal point adjusting method as set forth in claim 1, wherein:

in the spherical aberration correcting process, the spherical aberration of the focusing optical system is corrected by moving at least one lens of a lens group including one or more lens of the focusing optical system.

5. The focal point adjusting method as set forth in claim 1, further comprising:

repeating each of said spherical aberration correcting process and said focus offset adjusting process; and terminating said repeating after the focus offset adjustment process is performed at an end of the repetition.

6. The focal point adjusting method as set forth in claim 1, wherein said focus offset adjusting process is performed after both the focus error signal becomes close to zero and after said spherical aberration correcting process corrects for spherical aberration.

7. An optical pickup device, comprising:

a light source;

a focusing optical system that focuses a light beam radiated from the light source and which transmits another light beam that is reflected from a storing medium there through;

focusing error detecting means for detecting a focus error signal indicative of focal point displacement that occurs in a direction of an optical axis of the focused light beam;

focus control means for controlling an output of the focus error signal so that the output becomes close to zero;

focus offset adjusting means for adjusting offset of the focus error signal;

spherical aberration detecting means for detecting spherical aberration of the focusing optical system; and spherical aberration correcting means for correcting the spherical aberration, the focus offset adjusting means for determining and adjusting the offset of the focus error signal after (i) the focus control means controls the output of the focus error signal, and (ii) the spherical aberration correcting means corrects the spherical aberration.

8. The optical pickup device as set forth in claim 7, further comprising:

light beam splitting means for splitting, into (a) an inner circumferential region and (b) an outer circumferential region, the reflected light beam transmitted through the focusing optical system, the spherical aberration detecting means detecting the spherical aberration from a focus error signal obtained from at least one of (a) the inner circumferential region of the reflected light beam and (b) the outer circumferential region of the reflected light beam.

9. The optical pickup device as set forth in claim 8, wherein:

the spherical aberration detecting means generates a spherical aberration error signal indicative of the spherical aberration of the focusing optical system; and SAES, which is the spherical aberration error signal, satisfies any one of the following:

$$SAES=F1-(F1+F2)\times K1;$$

$$SAES=F2-(F1+F2)\times K2; \text{ and}$$

$$SAES=F1-F2\times K3,$$

where F1 is a first focus error signal obtained by detecting focal point displacement, which occurs in the direction of the optical axis, of the outer circumferential region of the reflected light beam, F2 is a second focus error signal obtained by detecting focal point displacement, which occurs in the direction of the optical axis, of the inner circumferential region of the reflected light beam, and K1, K2, and K3 are coefficients.

10. The optical pickup device as set forth in claim 7, wherein:

the spherical aberration correcting means corrects the spherical aberration by performing such an adjustment as to maximize an amplitude of a reproduction signal obtained by reading information stored in the storing medium.

11. The optical pickup device as set forth in claim 7, wherein:

the spherical aberration correcting means corrects the spherical aberration by performing such an adjustment as to maximize an amplitude of a tracking error signal indicative of the focal point displacement that occurs in a radial direction of the storing medium.

12. The optical pickup device as set forth in claim 7, wherein:

the focusing optical system is lens group including one or more lens; and the spherical aberration correcting means moves at least one lens of the lens group.

13. The optical pickup device as set forth in claim 7, wherein:

the focus offset adjusting means adjusts the offset of the focus error signal by performing such an adjustment as to maximize an amplitude of a reproduction signal obtained by reading information stored in the storing medium.

14. The optical pickup device as set forth in claim 13, further comprising:

tracking control means for (a) detecting a tracking error signal indicative of focal point displacement tat occurs in a radial direction of the storing medium, and (b) correcting, in accordance with the tracking error signal, the focal point displacement that occurs in the radial direction of the storing medium, the focus offset adjusting means adjusting the offset of the focus error signal whose focal point displacement tat occurs in the radial direction of the storing medium has been adjusted by the tracking control means.

15. The optical pickup device as set forth in claim 7, further comprising:

tracking control means for (a) detecting a tracking error signal indicative of focal point displacement that occurs in a radial direction of the storing medium, and (b) correcting, in accordance with the tracking error signal, the foe-al point displacement that occurs in the radial direction of the storing medium, the focus offset adjusting means adjusting the offset of the focus error signal by performing such an adjustment as to maximize an amplitude of the tracking error signal.

16. The optical pickup device as set forth in claim 7, wherein:

if (a) the storing medium has a plurality of information storing layers, and (b) information is recorded in and reproduced from the storing medium, the focus offset adjusting means adjusts the offset when the focal point of the light beam jumps from one of the information storing layers into another of the information storing layers.

17. The optical pickup device as set forth in claim 7, wherein:

if there is a repetition of (a) an offset adjustment for the focus error signal performed by the focus offset adjusting means and (b) a correction of the spherical aberration, the focus offset adjusting means performs, at an end of the repetition, (a) the offset adjustment for the focus error signal.

* * * * *

UNITED STATES PATENT AND TRADEMARK OFFICE
CERTIFICATE OF CORRECTION

PATENT NO. : 7,260,032 B2
APPLICATION NO. : 10/485404
DATED : August 21, 2007
INVENTOR(S) : Hiroyuki Tadano It is certified that error appears in the above-identified patent and that said Letters Patent is hereby corrected as shown below:

The title page item [22] the PCT filing date should be --July 30, 2002--

Signed and Sealed this

Eighteenth Day of December, 2007

JON W. DUDAS
*Director of the United States Patent and Trademark Office*